Aug. 15, 1939. J. N. KELLEY 2,169,422
PHOTOGRAPHIC CAMERA
Filed Oct. 2, 1936
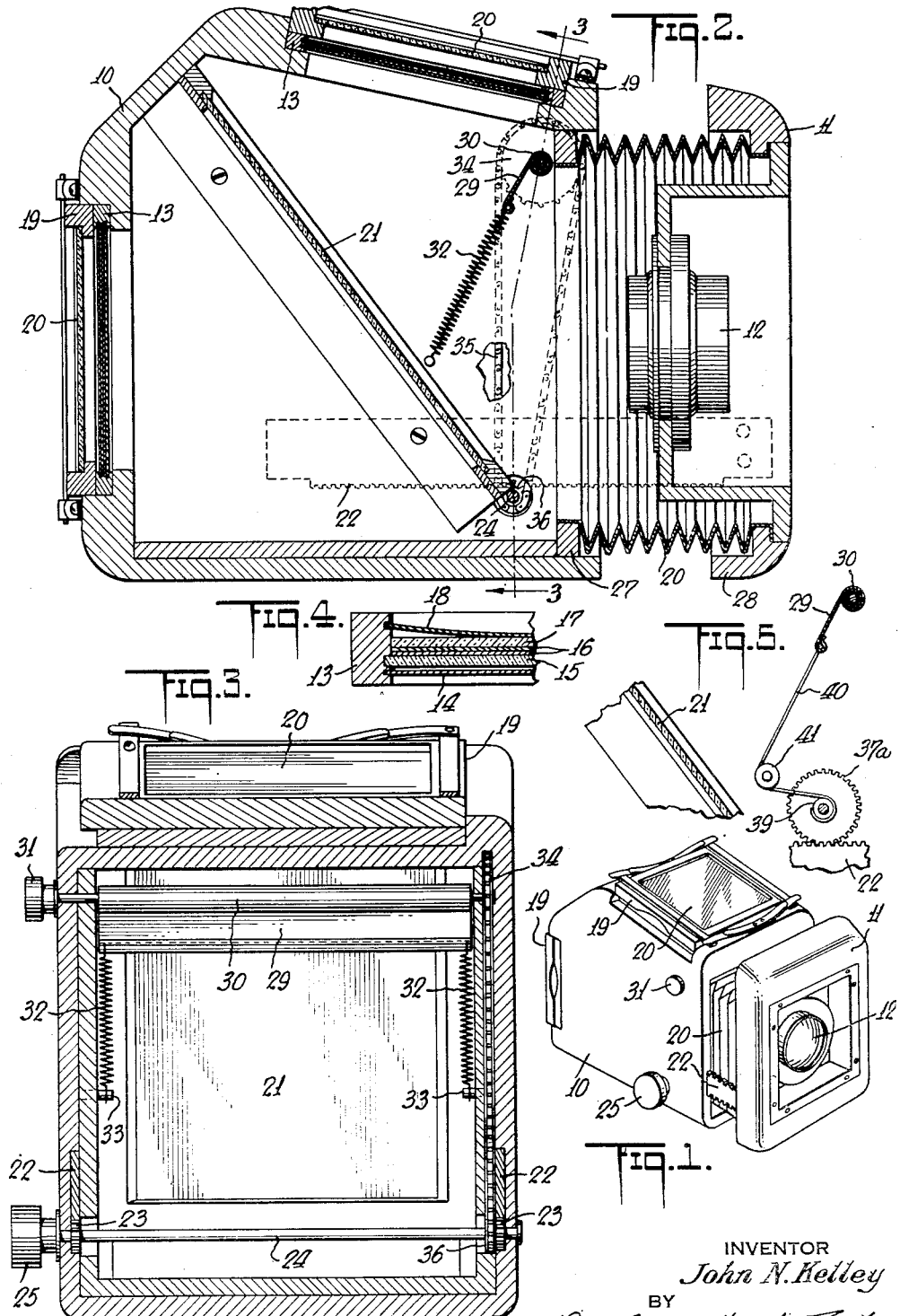
INVENTOR
*John N. Kelley*
BY
*Dean Fairbanks Hirsch Frater*
ATTORNEYS Patented Aug. 15, 1939

2,169,422

UNITED STATES PATENT OFFICE 2,169,422

PHOTOGRAPHIC CAMERA

John N. Kelley, New York, N. Y., assignor to Williams-Kelley Corporation, New York, N. Y., a corporation of New York Application October 2, 1936, Serial No. 103,684

7 Claims. (Cl. 95—2)

This invention relates to certain improvements in the type of camera designed for use in making color photographs, and in which the camera is provided with a plurality of sensitized surfaces which are simultaneously exposed to light rays from the lens to obtain a plurality of identical negatives constituting different color sensation records of the same subject, view or object. In such cameras it is common practice to employ one or more semi-transparent light reflectors which permit certain of the light rays to pass through to one sensitized surface disposed parallel to the plane of the lens and deflect other light rays to another surface at an angle thereto.

Cameras of this type have been open to the objection that with the usual relative arrangements of the parts it is possible to employ only comparatively small sensitized surfaces, as otherwise light rays at short focus may pass directly through the lens to at least a portion of one of the angularly disposed sensitized surfaces without being reflected by the semi-transparent reflector. Thus the resulting negative is not a true record of the light rays corresponding to a given color. If the camera box be so designed as to prevent such direct passage of light rays on short focus, it is not possible to obtain the maximum amount of light for long focus exposures.

The main object of my invention is to provide means whereby the maximum amount of light may pass to the sensitized surfaces on long focus exposures and direct passage of non-reflected light cannot pass to a laterally disposed sensitized surface when the lens is adjusted inwardly to short focus. To obtain this object I provide an adjustable light baffle or shutter so positioned and so formed that it may be readily moved to various positions, dependent upon the adjusted position of the lens.

A further object of the invention is to provide means whereby the adjusting of the lens to longer or shorter focus position automatically adjusts the light baffle or shutter to the proper corresponding position. To accomplish this object I provide suitable means interconnecting the baffle or shutter and the lens carrier, whereby the adjustment of one will effect a proportionate adjustment of the other.

As a further feature of the invention the camera box and lens carrier are so constructed and designed that the connecting bellows is housed partly in each of these members, and is entirely concealed when the camera box is closed with the lens in its innermost adjusted position.

In the accompanying drawing there is illustrated one embodiment of my invention, although it will be understood that there may be various other embodiments within the scope of my invention. In the drawing:

Fig. 1 is a perspective view of a camera which may be equipped with my improvements.

Fig. 2 is a vertical central longitudinal section.

Fig. 3 is a transverse section on the line 3—3 of Fig. 2.

Fig. 4 is a sectional detail of a film pack and holder which may be employed, and Fig. 5 is a partial section showing an alternative form of light baffle or shutter adjusting means.

I have illustrated my invention as incorporated in a camera having a box 10, an adjustable lens carrier 11 for the lens assembly 12, and openings for the insertion of two film packs, one at the rear and the other on the top. The film packs and carriers may be of the usual type and may be removably mounted in any suitable manner. Merely as an example I have shown in Fig. 4 a film pack and holder including a frame 13 adapted to support a thin, removable, opaque slide 14, a fixed glass plate 15, two removable sensitized films 16, a glass pressure plate 17, and an opaque slide 18, which latter may be bowed or spring pressed to hold the two glass plates and the intermediate sensitized films firmly pressed together. The film pack holder may be slidably mounted in the wall of the camera box and yieldingly held in position by a spring pressed frame 19 carrying a ground glass 20. I do not claim any novelty in the film pack, its carrier, or the method of mounting the same, as these may be of standard construction.

One of the film packs is mounted in the rear wall of the camera box with its center substantially in the optical axis of the lens, while the other is mounted on the top of the box and slightly tilted, so that its edge nearest the lens is lower than its opposite edge. The inclinnation of this film pack is preferably approximately 15° to the optical axis of the lens.

Within the camera box is mounted a semi-transparent reflector 21 which will permit the passage of certain light rays directly therethrough to the rear film pack, and will reflect other light rays upwardly and slightly forwardly to the upper film pack. This reflector is preferably at an angle of approximately 52° to the optical axis of the lens.

For the making of color photographs with three sensitized surfaces corresponding to the three primary colors the rear film pack may have a single sensitized film which is acted upon only by the blue rays, the red and yellow rays being reflected upwardly by the mirror. The upper film pack may have two superposed sensitized films with the emulsion surfaces together, and one colored to cut off certain light rays from the other, so that one will be acted upon by the red rays and the other by the yellow rays.

The lens carrier 11 is connected to a pair of rack bars 22 mounted on opposite sides of the camera box and engaging with sprocket wheels 23 on a transverse shaft 24, provided with an operating handle or knob 25. By turning this knob the lens carrier may be racked outwardly or inwardly to the desired position. The lens carrier and the main body of the box are connected by a bellows 26, and in order to make the camera compact and to protect the bellows when the lens is in innermost position, I connect the inner end of the bellows to a frame 27 spaced inwardly from the end of the box and provide the lens carrier with a rearwardly extending peripheral flange 28 providing a recess for the outer end portion of the bellows. Thus, when the lens carrier is racked to the innermost limiting position this flange will abut against the end of the camera box and the bellows will be entirely housed partly in the lens carrier frame and partly in the space at the outer side of the frame 27, so that it is entirely concealed and protected.

With a camera box of the minimum size and with the maximum size of sensitized surfaces, the lens in its innermost position, that is for short focus pictures, may permit certain light rays of the entire spectrum to pass through the lens and upwardly and rearwardly to the upper film pack, and without having been reflected by the reflector 21. If the parts be so designed and so positioned that this cannot take place, for instance if a stationary partition be employed within the box to cut off such light rays, the amount of light which may become effective is reduced for long focus exposures.

As an important feature of my invention I provide a light baffle 29 which is preferably in the form of a curtain and wound on a roller 30 adjacent to the top of the camera box, below the forward end of the upper film pack, and adjacent to the bellows supporting frame 27. By rolling up or unrolling this curtain the lower edge may be brought toward or from the reflector, and may be adjusted to such position that it is substantially completely wound up and out of the path of any light rays for long focus pictures, and will be lowered to cut off any light rays passing directly from the lens to the upper film pack for short focus pictures. For operating the curtain there may be provided a knob 31 on the shaft of the curtain roller, and the free edge of the curtain may be connected to coil springs 32 anchored at their opposite ends on retainers 33 adjacent to the reflector and intermediate of the upper and lower ends thereof. There may be sufficient friction in the mounting of the shaft of the roller so that the springs alone cannot unroll the curtain, but the curtain will remain in any position of adjustment and will be held taut by the springs.

In some constructions it may be desirable to adjust the curtain and the lens independently, and the knob 31 may be provided with suitable indicating mechanism to show the position of the light baffle or curtain so that it may be set at the proper point for any adjustment of the lens carrier.

Preferably the lens carrier and the curtain are interconnected so that when one is adjusted the other will be automatically moved to the proper position. Various means may be employed for effecting such interconnections. In Figs. 2 and 3 I have shown the shaft of the curtain roller provided with a sprocket wheel 34 connected by a chain 35 to a sprocket wheel 36 on the shaft 24. Thus, as the rack bar is moved toward the right in adjusting the lens carrier outwardly, the two sprocket wheels 34 and 36 will be rotated clockwise and the curtain wound up. Likewise, when the lens carrier is adjusted inwardly the curtain will be pulled down. The two sprocket wheels may be of such relative sizes that a comparatively long movement of the rack bar will give the proper but shorter movement of the curtain.

Various other connecting means may be employed. Merely as an example I have shown somewhat diagrammatically in Fig. 5 a construction in which a pinion 37a, is provided with a small drum 39 to which is connected a wire or cord 40 extending around a loose pulley 41 to the lower edge of the curtain. In this case the roller of the curtain may be provided with a coil spring normally tending to wind up the curtain. As the rack bar 22 is moved outwardly the wire will be unwound from the drum 39 and the spring will wind up the curtain. Similarly, when the rack bar is moved inwardly, the wire is wound up on the drum 39 and the curtain is pulled downwardly. The size of the drum 39 in respect to the pinion 37a will control the extent of movement of the curtain for any given adjustment of the lens carrier. Various other interconnecting mechanisms might be employed. With the type shown in Fig. 5 the parts illustrated may be duplicated so that there will be two of the wires connected to the two opposite corners of the curtain. In this construction the upper knob 31 may be omitted. As the sprocket and chain construction shown in Figs. 2 and 3 operates on the shaft of the roller, it is necessary to provide the sprockets and chain on only one side, but two of the springs 32 may be employed.

Having thus described my invention, what I claim as new and desire to secure by Letters Patent is:

1. A multi-color camera including a casing having an adjustable lens carrier, a support for a sensitized surface at one side of the optical axis of the lens, a semi-transparent mirror intersecting said axis, a flexible opaque baffle mounted on a roller adjacent to the edge of said surface nearest to said lens, and means for unrolling and extending said baffle between said mirror and said lens carrier and toward said mirror in a plane at an acute angle to the optical axis of the lens and in a position out of the path of the image forming rays to said mirror.

2. A multi-color camera including a casing having an adjustable lens carrier, a support for a sensitized surface at one side of the optical axis of the lens, a semi-transparent mirror intersecting said axis, a flexible opaque baffle mounted on a roller disposed intermediate of said surface and said lens, means for rotating said roller to roll up or unroll said baffle, and a spring normally tending to unroll said baffle and extend it toward said mirror in a plane at an acute angle to the optical axis of the lens and in a position out of the path of the image forming rays to said mirror.

3. A multi-color camera including a casing having a lens carrier, a support for a sensitized surface at one side of the optical axis of the lens, a semi-transparent mirror intersecting said axis, an adjustable baffle between the lens and said surface and out of the path of the image forming rays to said mirror for preventing direct passage of light from the lens to said surface, and interconnecting means for simultaneously moving said lens carrier to change the focus and moving said baffle toward or from the optical axis of the lens to block direct passage of light from the lens to said surface for short focus exposures, and to permit the maximum amount of light to pass to said mirror for long focus exposures.

4. A multi-color camera including a casing having a lens carrier, a support for a sensitized surface at one side of the optical axis of the lens, a semi-transparent mirror intersecting said axis, an adjustable baffle for preventing direct passage of light from the lens to said surface, a member for adjusting said lens carrier, and means operatively connected to said member for simultaneously adjusting said baffle to block direct passage of light from the lens to said surface for short focus exposures, and to permit the maximum amount of light to pass to said mirror for long focus exposures.

5. A multi-color camera including a casing having a lens carrier, a support for a sensitized surface at one side of the optical axis of the lens, a semi-transparent mirror intersecting said axis, an adjustable baffle between the lens and said surface and out of the path of the image forming rays to said mirror for preventing direct passage of light from the lens to said surface, a rack bar for adjusting said lens carrier to vary the focus, and means operatively connected to said rack bar for adjusting said baffle to block direct passage of light from the lens to said surface for short focus exposures, and to permit the maximum amount of light to pass to said mirror for long focus exposures.

6. A multi-color camera including a casing having a lens carrier, a support for a sensitized surface at one side of the optical axis of the lens, a semi-transparent mirror intersecting said axis, an adjustable baffle between the lens and said surface and out of the path of the image forming rays to said mirror for preventing direct passage of light from the lens to said surface, a rack bar for adjusting said lens carrier to vary the focus, and means operatively connected to said rack bar for adjusting said baffle in its own plane to block direct passage of light from the lens to said surface for short focus exposures, and to permit the maximum amount of light to pass to said mirror for long focus exposures.

7. A multi-color camera including a casing having a lens carrier, a support for a sensitized surface at one side of the optical axis of the lens, a semi-transparent mirror intersecting said axis, a flexible, substantially opaque baffle mounted on a roller disposed intermediate of said surface and the lens and out of the path of the image forming rays to said mirror, means for arjusting the lens carrier toward and from said mirror, and means inteconnected to said last mentioned means for simultaneously rolling or unrolling said baffle.

JOHN N. KELLEY.